United States Patent [19]
Louden

[11] Patent Number: 5,297,534
[45] Date of Patent: Mar. 29, 1994

[54] BARBECUE GRILL APPARATUS

[76] Inventor: William R. Louden, 23209 Tuttle Lake Rd., Neshkoro, Wis. 54960

[21] Appl. No.: 75,603

[22] Filed: Jun. 14, 1993

[51] Int. Cl.$^5$ .......................... A47J 37/07; F24B 3/00; F24C 1/16
[52] U.S. Cl. ....................................... 126/30; 99/449; 99/450; 126/9 R; 126/25 A
[58] Field of Search ................. 99/339, 340, 419, 448, 99/449, 450, 482; 126/9 R, 9 B, 25 R, 25 A, 30, 29; 248/125, 156, 185, 530, 533

[56] References Cited

U.S. PATENT DOCUMENTS

| | | | |
|---|---|---|---|
| 3,067,734 | 12/1962 | Lucas | 126/30 |
| 3,152,536 | 10/1964 | Lucas | 126/30 |
| 3,699,876 | 10/1972 | Ellis | 99/396 |
| 3,785,360 | 1/1974 | Martin | 126/9 R |
| 4,120,280 | 10/1978 | Iverson et al. | 126/30 |
| 4,538,589 | 9/1985 | Preston | 126/25 A |
| 4,622,945 | 11/1986 | Glitten | 248/533 |
| 4,719,898 | 1/1988 | Stanislawski | 126/9 R |
| 4,732,138 | 3/1988 | Vos | 99/450 |
| 4,854,297 | 8/1989 | Shuman | 126/25 A |
| 5,025,715 | 6/1991 | Sir | 99/449 |

FOREIGN PATENT DOCUMENTS 655776  1/1963  Canada .................. 126/30

Primary Examiner—Timothy F. Simone
Attorney, Agent, or Firm—Leon Gilden

[57] ABSTRACT

A barbecue pit is arranged to include a rotary shaft mounted in adjacency to the pit having an extension shaft, wherein a mesh basket is arranged for selective positioning over the barbecue pit for ease of access to the basket and for food components positioned thereon. A rotisserie housing is mounted to the basket structure in an intercommunication to permit selective rotation of the basket over the pit structure.

2 Claims, 4 Drawing Sheets

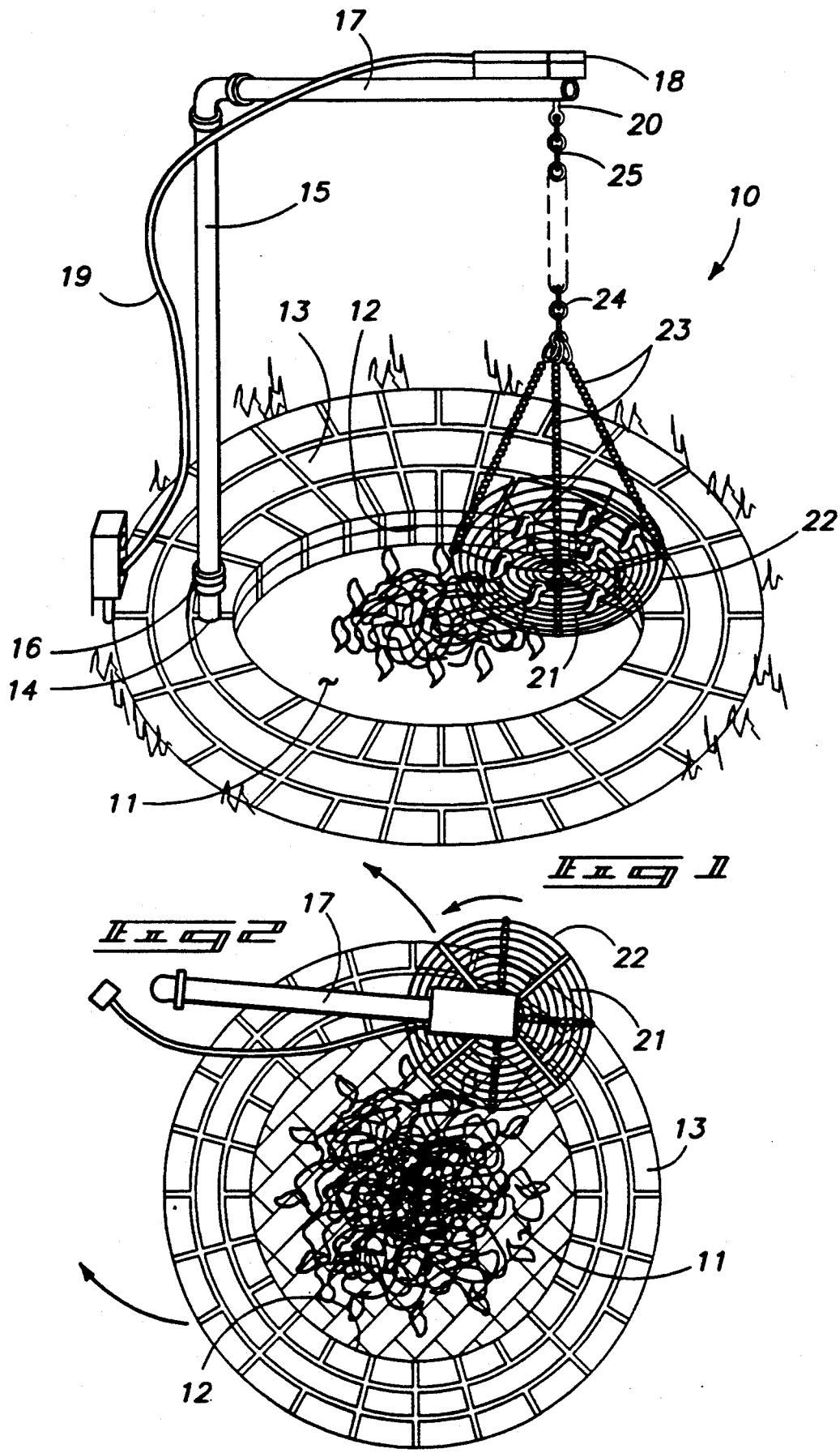

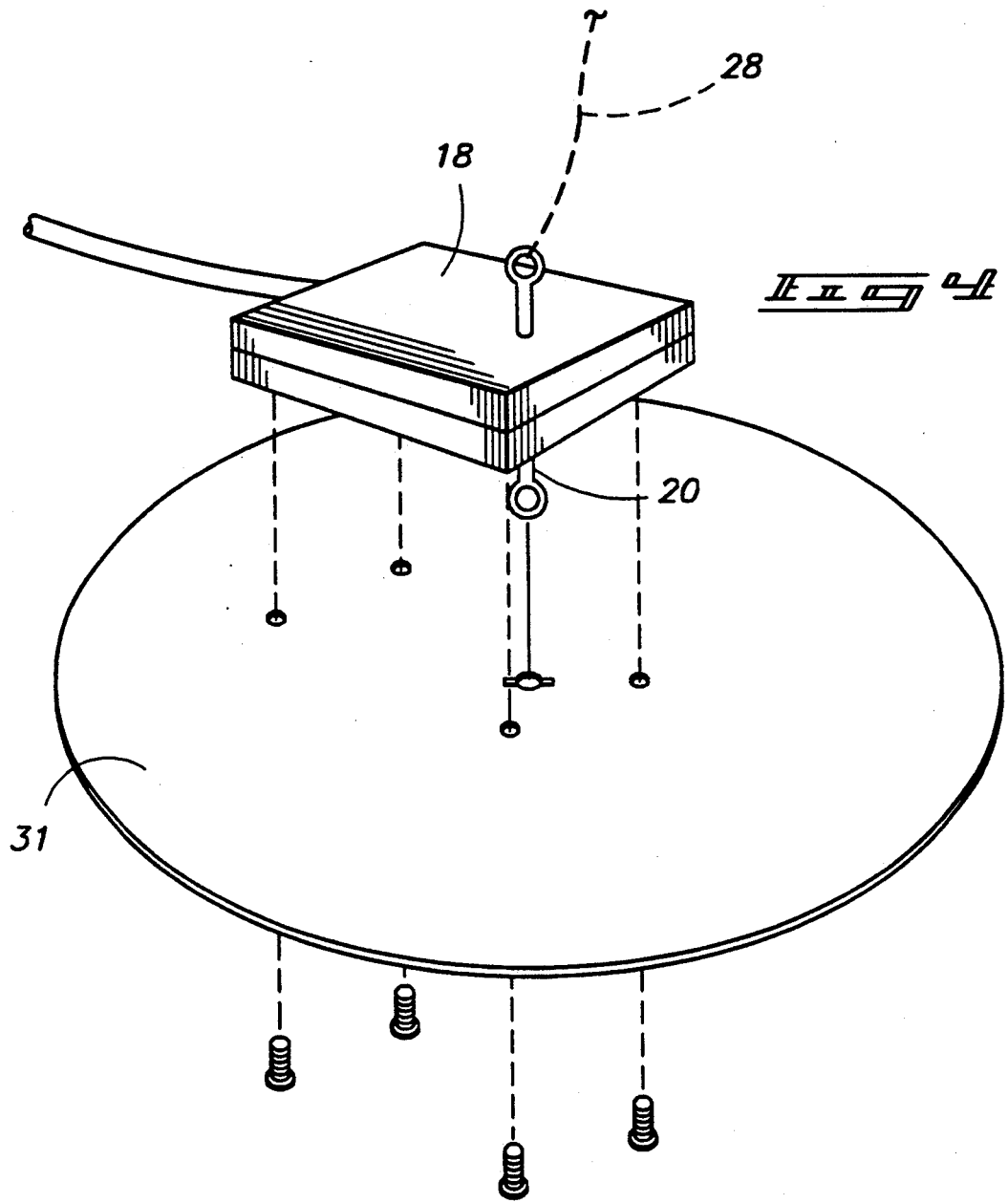

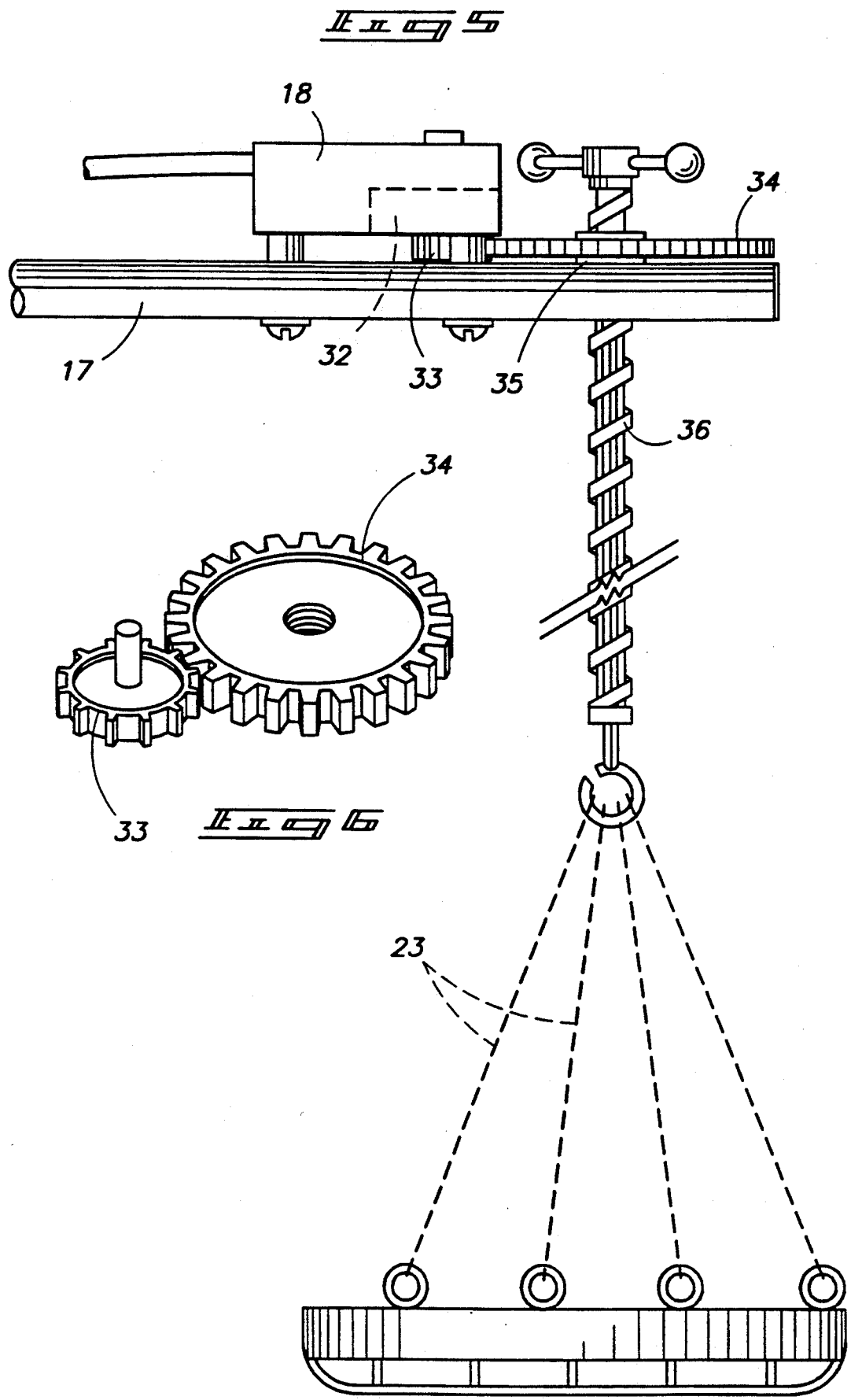

BARBECUE GRILL APPARATUS

BACKGROUND OF THE INVENTION

1. Field of the Invention

The field of invention relates to barbecue grill apparatus, and more particularly pertains to a new and improved barbecue grill apparatus wherein the same is arranged for selective rotation and positioning over an associated barbecue grill pit structure.

2. Description of the Prior Art

Barbecue grills of various types are utilized throughout the prior art and exemplified by the U.S. Pat. Nos. 3,699,876; 4,702,224; and 4,162,650.

The instant invention attempts to overcome deficiencies of the prior art by providing for a barbecue grill apparatus wherein the same is arranged for selective positioning over an associated barbecue grill pit and rotation of the associated support basket structure and in this respect, the present invention substantially fulfills this need.

SUMMARY OF THE INVENTION

In view of the foregoing disadvantages inherent in the known types of barbecue grill apparatus now present in the prior art, the present invention provides a barbecue grill apparatus wherein the same provides for a mesh basket arranged for support over an associated barbecue grill pit for pivoting displacement by a rotary shaft relative to the pit of the basket structure. As such, the general purpose of the present invention, which will be described subsequently in greater detail, is to provide a new and improved barbecue grill apparatus which has all the advantages of the prior art barbecue grill apparatus and none of the disadvantages.

To attain this, the present invention provides a barbecue pit arranged to include a rotary shaft mounted in adjacency to the pit having an extension shaft, wherein a mesh basket is arranged for selective positioning over the barbecue pit for ease of access to the basket and for food components positioned thereon. A rotisserie housing is mounted to the basket structure in an intercommunication to permit selective rotation of the basket over the pit structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved barbecue grill apparatus which has all the advantages of the prior art barbecue grill apparatus and none of the disadvantages.

It is another object of the present invention to provide a new and improved barbecue grill apparatus which may be easily and efficiently manufactured and marketed.

It is a further object of the present invention to provide a new and improved barbecue grill apparatus which is of a durable and reliable construction.

An even further object of the present invention is to provide a new and improved barbecue grill apparatus which is susceptible of a low cost of manufacture with regard to both materials and labor, and which accordingly is then susceptible of low prices of sale to the consuming public, thereby making such barbecue grill apparatus economically available to the buying public.

Still yet another object of the present invention is to provide a new and improved barbecue grill apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention.

FIG. 2 is an orthographic top view of the invention.

FIG. 4 is an isometric exploded view of the rotisserie housing arranged for suspended orientation relative to the barbecue grill mesh basket.

FIGS. 5 and 6 are orthographic views of the basket structure arranged for rotary mounting employing a drive gear mechanism.

DESCRIPTION OF THE PREFERRED EMBODIMENT

Figure 3:
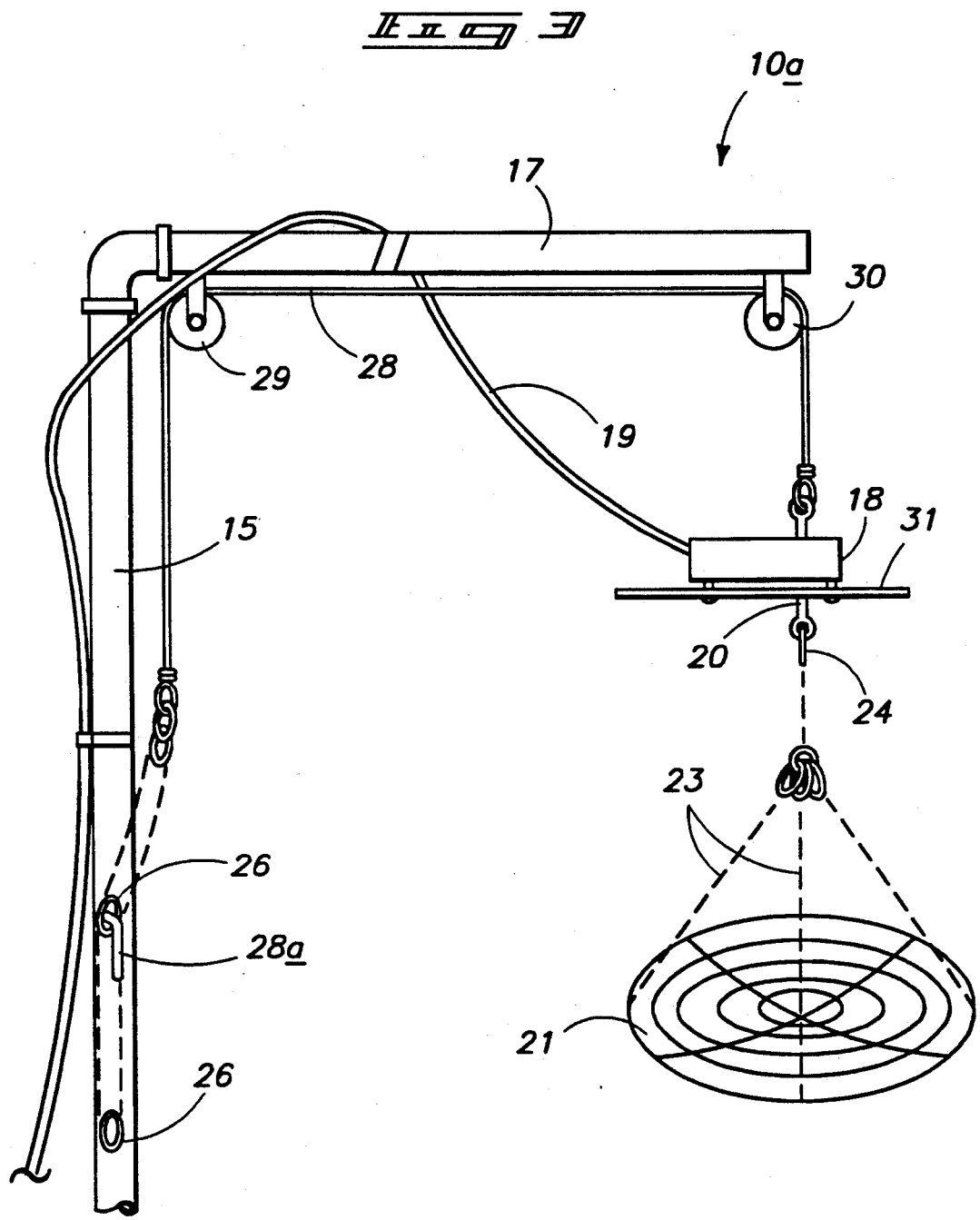
FIG. 3 is an isometric illustration of a modified aspect of the invention.

With reference now to the drawings, and in particular to FIGS. 1 to 5 thereof, a new and improved barbecue grill apparatus embodying the principles and concepts of the present invention and generally designated by the reference numerals 10 and 10a will be described.

More specifically, the barbecue grill apparatus 10 of the instant invention essentially comprises a fire pit 11, having a fixed pit side wall 12 extending around the fire pit 11, with a fixed pit top wall 13 extending beyond the side wall 12. A support tube 14 is fixedly mounted to the top wall 13 in adjacency to the side wall 12 mounting a rotary shaft 15 within the support tube 14, with the rotary shaft extending longitudinally beyond the support tube. The rotary shaft 15 includes a collar 16 fixedly mounted to the rotary shaft arranged to abut the support tube 14 for ease of pivoting and orientation of the rotary shaft 15. An extension leg 17 is fixedly and obliquely mounted to the rotary shaft 15 at a predetermined junction, such that a rotisserie housing 18 mounted to the extension leg 17 spaced from the junction in electrical communication with the electrical power supply 19 to effect rotation of the rotisserie housing output shaft 20 directed through the extension leg 17. A mesh basket 21 is provided, having a mesh basket periphery 22. A plurality of support lines 23 are secured an equal distance about the periphery and are joined together above the mesh basket 21 between the basket 21 and the extension leg 17 at a support line junction 24, with a central cable 25 extending from the output shaft 20 to the support line junction 24.

The FIG. 3 indicates the apparatus 10a having additionally a first pulley 29 mounted to the junction of the support tube 14 and the extension leg 17, and a second pulley 30 mounted in a spaced relationship rotatably relative to the extension leg 17 spaced from the first pulley 29. A central cable 28 is provided extending about the first and second pulleys 29 and 30 terminating in a central cable hook 28a for securement to one of a plurality of rotary shaft mounting rings 26 fixedly mounted at spaced intervals longitudinally of the rotary shaft 15 to provide for raising and lowering of the associated basket 21 that is suspended at a distant end of the cable 28 spaced from the hook 28a. A rotisserie housing heat shield 31 is provided mounting the rotisserie housing 18, wherein the power supply cable 19 prevents undue rotation of the rotisserie housing when the rotisserie housing output shaft 20 is rotatably activated to effect rotation of the basket 21.

As indicated in the FIG. 5, the drive motor 32 of the rotisserie housing 18 is indicated having an output gear 30 mounted to the shaft structure cooperative with a drive gear 34, that in turn includes a central drive gear block 35 medially of the drive gear, wherein a worm shaft 36 is adjustably and longitudinally directed through the central block 35 to permit height adjustment of the basket 21.

The organization of the instant invention permits rotary displacement of the basket 21 relative to the underlying fire pit 11 for access to food components positioned upon the basket, as well as positioning raising and lowering of the basket relative to the associated fire, in a manner as indicated in FIGS. 3 and 5.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A barbecue grill apparatus, comprising,
   a fire pit, having a fixed pit side wall and a fixed pit top wall, with the top wall extending beyond the side wall, with a support tube mounted to the top wall fixedly thereof in adjacency to the side wall, a rotary shaft received within the support tube, with the rotary shaft extending longitudinally beyond the support tube, and
   an extension leg fixedly mounted to the rotary shaft at a junction, with the extension leg arranged for extension over the fire pit, and
   a rotisserie housing, the rotisserie housing secured relative to the extension leg, with the rotisserie housing having an output shaft, and the output shaft including a central cable, with the central cable extending in a spaced relationship relative to the support tube, and
   a plurality of support lines intersecting at a support line junction, with the support line junction secured to the central cable, and the support lines having a mesh basket positioned and secured to the support lines spaced from the support line junction, with the support tube arranged for pivoting the mesh basket arcuately relative to the fire pit.

2. An apparatus as set forth in claim 1 including a first pulley mounted rotatably to the extension leg in adjacency to the junction, and a second pulley mounted to the extension leg spaced from the first pulley, and a control cable, the control cable having control cable first end terminating in a hook member, and a control cable second end secured to the rotisserie housing, the rotisserie housing having a heat shield oriented between the extension leg and the mesh basket, and an electrical power supply line extending from the rotisserie housing directing electrical communication to the rotisserie housing to permit selective rotation of the output shaft and the mesh basket, and the support shaft having a plurality of spaced mounting rings fixedly mounted to the support shaft at spaced intervals' longitudinally of the support shaft for receiving said hook within one of said rings.

* * * * *